US010271359B2

(12) United States Patent
Bernsen et al.

(10) Patent No.: US 10,271,359 B2
(45) Date of Patent: Apr. 23, 2019

(54) WIRELESS COMMUNICATION SYSTEM (71) Applicant: KONINKLIJKE PHILIPS N.V., Eindhoven (NL)

(72) Inventors: Johannes Arnoldus Cornelis Bernsen, Eindhoven (NL); Walter Dees, Eindhoven (NL); Franciscus Antonius Maria Van De Laar, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 149 days.

(21) Appl. No.: 15/300,030

(22) PCT Filed: Mar. 31, 2015

(86) PCT No.: PCT/EP2015/057123
§ 371 (c)(1),
(2) Date: Sep. 28, 2016

(87) PCT Pub. No.: WO2015/150428
PCT Pub. Date: Oct. 8, 2015

(65) Prior Publication Data
US 2017/0164413 A1 Jun. 8, 2017

(30) Foreign Application Priority Data
Mar. 31, 2014 (EP) .................................... 14162666

(51) Int. Cl.
*G06F 7/04* (2006.01)
*H04W 76/10* (2018.01)
(Continued)

(52) U.S. Cl.
CPC ......... *H04W 76/10* (2018.02); *H04L 63/0492* (2013.01); *H04L 63/18* (2013.01); *H04W 4/80* (2018.02); *H04W 12/08* (2013.01)

(58) Field of Classification Search
CPC .... H04L 63/0492; H04L 63/18; H04W 12/08; H04W 4/80
(Continued)

(56) References Cited

U.S. PATENT DOCUMENTS

2011/0210820 A1 9/2011 Talty
2011/0275316 A1 11/2011 Suumaki
(Continued)

FOREIGN PATENT DOCUMENTS

WO WO2010036501 A2 4/2010
WO WO2012117306 A1 9/2012
(Continued)

OTHER PUBLICATIONS

Wi-Fi Allicance: "Wi-Fi Simple Configuration Technical Specification", Jan. 30, 2012 (Jan. 30, 2012), pp. 1-154, XP055050847.
(Continued)

Primary Examiner — Samson B Lemma
(74) Attorney, Agent, or Firm — Larry Liberchuk (57) ABSTRACT A host (100) provides a service to a dockee (120) via wireless docking. The host has a host wireless communication unit (102) and a near field receiver (103). When the user places the dockee near the host within a near field communication (153) distance, a near field transmitter (123) transmits a service search signal comprising a dockee identifier and a dockee service list for indicating services which are relevant to the dockee. The host determines a matching service set of services that are available at the host, and transmits, via the host communication unit, a service available signal comprising the dockee identifier and the matching service set via the host communication unit. The dockee processor determines whether the received dockee identifier corresponds to the dockee identifier and any of the matching (Continued)

services is actually required by the dockee, and if so, initiates the wireless docking with the host.

14 Claims, 6 Drawing Sheets

(51) Int. Cl.
  *H04L 29/06* (2006.01)
  *H04W 12/08* (2009.01)
  *H04W 4/80* (2018.01)
(58) Field of Classification Search
  USPC .............................................................. 726/5
  See application file for complete search history.

(56) References Cited

U.S. PATENT DOCUMENTS

2012/0099566 A1\* 4/2012 Laine ................. H04M 1/7253
  370/338
2013/0029596 A1 1/2013 Preston
2014/0370810 A1\* 12/2014 Huang .................... H04B 7/26
  455/41.2

FOREIGN PATENT DOCUMENTS

| WO | WO2013111537 A1 | 8/2013 |
| WO | WO2015092057 A2 | 6/2015 |

OTHER PUBLICATIONS

"System Description Wireless Power Transfer, vol. I: Low Power, Part 1: Interface Definition Version 1.0.1, Version 1.0.1, Oct. 2010" available from the Wireless Power Consortium: http://www.wirelesspowerconsortium.com/ (pre 3).

Bluetooth Specification, Core Package version 2.1 + EDR, issued: Jul. 26, 2007.

\* cited by examiner

WIRELESS COMMUNICATION SYSTEM

FIELD OF THE INVENTION

The invention relates to a wireless communication system comprising a host and at least one dockee, the host arranged for, via wireless communication, providing at least one service and the dockee arranged for wireless docking with the host for using the service. The host may have one or more built in peripherals, and/or may be arranged for coupling to at least one external peripheral to constitute a wireless docking environment. Providing the service may involve providing access to a respective peripheral for the dockee.

The invention further relates to a dockee, to a host, a host method, a dockee method, and a computer program product for wireless communication between a host and a dockee.

The invention relates to the field of wireless communication, e.g. via Wi-Fi, and more specific to docking of a wireless dockee to a wireless docking environment of a host and one or more peripherals. In this context peripherals may be external devices like a display, keyboard, or mouse, or peripherals built in a host like a loudspeaker or storage unit. For example, a TV may be also a host, i.e. the host is built in the TV and constitutes a host in combination with a number of peripherals. Accessing and/or using such peripherals and/or any other internal or external resources of the host may be called services provided by a host.

BACKGROUND OF THE INVENTION

Wi-Fi devices can offer all kinds of services. These may be services such as video rendering, audio rendering, printing, using a USB device such as a keyboard or a mouse over Wi-Fi, etc. Wi-Fi devices can 'advertise' these services over Wi-Fi, such that it is possible for other devices with a Wi-Fi radio to see what Wi-Fi services are available in their vicinity. A Wi-Fi device may also ask (probe') another Wi-Fi device about which Wi-Fi services it has to offer. Wi-Fi offers various ways to do such pre-association discovery.

Wireless docking in a system having a host device and dockees may be based on using a Wi-Fi (as described in IEEE802.11) based wireless docking station. The wireless docking station may be a wireless docking host (called WDH, or host) that enables a mobile device (called MD, or dockee) to access to a set of peripherals locally attached through a wire or wirelessly connected to the host device (such as USB mouse, HDMI display, Bluetooth headset) through a set of general message exchange protocols over a wireless link (e.g. Wi-Fi). A host coupled together with one or more wired or wireless peripherals is called a wireless docking environment. A host may also be a further mobile device having available one or more services for a dockee. Wireless docking is known, for example, from WO 2012/117306A1. A wireless docking station enables a wireless secured communication between at least one slave device and a master device.

The wireless docking host may provide information about its presence through a Wi-Fi beacon that dockees can use to select and initiate connections with a chosen host. Alternatively, Near Field Communication (NFC) tags associated with the host or other out of band means (such as using the communications interface of a wireless power system) may be used to communicate with a host to dock with. Using NFC for out-of-band device discovery is known, e.g., from chapter 3.1.2.7 of the Wi-Fi Peer-to-Peer (P2P) Technical Specification DRAFT v1.3.32, available from the Wi-Fi Alliance, Technical Committee P2P Task Group, via http://www.wi-fi.org/specifications.php or the document Wi-Fi Protected Setup pairing with NFC, available on http://msdn.microsoft.com/en-us/library/windows/hardware/dn481543%28v=vs.85%29.aspx, called Wi-Fi P2P standard in this document. Also, out-of-band means different from the main wireless communication radio band. For example, one speaks about an out-of-band channel, meaning a communication method that is of a different kind, e.g. NFC versus Wi-Fi.

Document US2013/0029596 describes pairing of wireless (BLUETOOTH) devices using data exchanged in an out-of-band (NFC) channel. Two devices are determined to be within near field communication (NFC) range of each other, and pairing information for a service is conveyed over the out-of-band channel. The conveying of the pairing information can require the first device to request at least one desired service and to provide a device ID. In response, the second device can, via the out-of-band channel, either deny the request or convey resource use parameters for the desired service and an ID for the second device. Pairing the two devices can use the resource use parameters.

Document WO2013/111537 discloses a communication system of a camera and a printer. The devices may communicate in a first mode (NFC) or in a second mode (Wi-Fi P2P). Startup in a first mode and handover between both modes is described.

Document Wi-Fi alliance "Wi-Fi Simple Configuration Technical Specification" v2.0.2 describes in section 10 "NFC Out-of-Band Interface Specification" using NFC as an out-of-band channel for Wi-Fi Simple Configuration. A password token or configuration token defining a WLAN configuration may be exchanged via NFC.

Document US2011/0210820 describes a system for simply and securely pairing multiple Bluetooth or other wireless electronic devices in a network. Multiple Near Field Communication (NFC) read-only tags are places in a vehicle or other defined space, such that users of NFC-enabled electronic devices can pass their device near one of the NFC tags, which then transfers encryption key data to the user's device, allowing that device to be automatically joined to a small, secure wireless network.

Document US 2011/0275316 describes a communication system that uses near-field communication in out-of-band initialization for connection setup for device-to-device communication.

SUMMARY OF THE INVENTION

The user of a Wi-Fi device may select a device offering one or more services from a list of discovered devices in range and may try to connect with it to use a service. Making such a connection takes time, several seconds up to several tens of seconds, and usually requires user intervention, such as reading a PIN code of the device to connect to and entering it in their own device.

Since the range of Wi-Fi signals can reach tens of meters, quite a number of devices offering Wi-Fi services may be discovered within Wi-Fi range. The user may be involved in selecting the correct device/service to connect to. However, from the list of devices/services presented to the user it may not be very clear which entry corresponds to which device.

It is an object of the invention to provide a system for wireless docking that enables setting up a connection and acquiring services while reducing the amount of user interaction and time needed.

For this purpose, according to a first aspect of the invention, in the wireless communication system as described in the opening paragraph, the host comprises
  a host communication unit for accommodating the wireless communication,
  a near field receiver for near field communication with a near field transmitter across a near field operational distance of at most one meter,
  a host processor coupled to the host communication unit and the near field receiver, and arranged for docking the dockee,
the dockee comprising
  a dockee communication unit for accommodating said wireless communication,
  a dockee processor arranged for docking with the host,
  a near field transmitter for near field communication with a near field receiver across the near field operational distance,
  the near field transmitter being arranged for transmitting a service search signal comprising a dockee identifier and a dockee service list for indicating services which are relevant to the dockee, and
  the host processor being arranged for, upon receiving the service search signal via the near field receiver,
determining a matching service set by matching the dockee service list against the services that are available at the host,
generating a service available signal comprising the dockee identifier and the matching service set for indicating matching services which are both relevant to the dockee and available via wireless docking, and
transmitting the service available signal via the host communication unit, and
  the dockee processor being arranged for, upon receiving the service available signal via the dockee communication unit, determining whether the received dockee identifier corresponds to the dockee identifier of the dockee and whether any of the matching services is actually required by the dockee, and if so, initiating the wireless docking with the host via the dockee communication unit.

For this purpose a host device for use in the above system is arranged for wireless docking for providing a service and comprises
  a host communication unit for wireless communication,
  a near field receiver for near field communication with a near field transmitter across the near field operational distance, and
  a host processor coupled to the host communication unit and the near field receiver, and arranged for docking the dockee,
  the host processor being arranged for, upon receiving the service search signal via the near field receiver,
determining a matching service set by matching the dockee service list against the services that are available at the host,
generating a service available signal comprising the dockee identifier and the matching service set for indicating matching services which are both relevant to the dockee and available via wireless docking, and
transmitting the service available signal via the host communication unit.

For this purpose, a dockee for use in the above system is arranged for wireless docking with the host for using a service and comprises
  a dockee communication unit for wireless communication,
  a dockee processor arranged for docking with the host,
  a near field transmitter for near field communication with a near field receiver across the near field operational distance,
  the near field transmitter being arranged for transmitting a service search signal comprising a dockee identifier and a dockee service list for indicating services which are relevant to the dockee, and
  the dockee processor being arranged for, upon receiving a service available signal via the dockee communication unit, the service available signal comprising a dockee identifier and a matching service set for indicating matching services which are both relevant to the dockee and available at the host, determining whether the received dockee identifier corresponds to the dockee identifier of the dockee and whether any of the matching services is actually required by the dockee, and if so, initiating the wireless docking with the host via the dockee communication unit.

For this purpose, a host method of wireless communication is provided for use in the above system in a host comprising a host communication unit for wireless communication, and a near field receiver for near field communication with a near field transmitter across a near field operational distance of at most one meter. The method, at the host, comprises, upon receiving a service search signal via the near field receiver, the service search signal comprising a dockee identifier and a dockee service list for indicating services which are relevant to the dockee,
  determining a matching service set by matching the dockee service list against the services that are available at the host,
  generating a service available signal comprising the dockee identifier and the matching service set for indicating matching services which are both relevant to the dockee and available via wireless docking, and
  transmitting the service available signal via the host communication unit, and, upon initiating wireless docking by the dockee,
  docking the dockee with the host for using the service.

For this purpose, a dockee method of wireless communication is provided for use in the above system in a dockee comprising a dockee communication unit for wireless communication, and a near field transmitter for near field communication with a near field receiver across the near field operational distance. The near field transmitter is arranged for transmitting a service search signal comprising a dockee identifier and a dockee service list for indicating services which are relevant to the dockee. The method, at the dockee, comprises, upon receiving a service available signal via the dockee communication unit, the service available signal comprising a dockee identifier and a matching service set for indicating matching services which are both relevant to the dockee and available at the host, determining whether the received dockee identifier corresponds to the dockee identifier of the dockee and whether any of the matching services is actually required by the dockee, and if so, initiating the wireless docking with the host.

The methods according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer. In an embodiment, the computer program comprises computer program code means adapted to perform all the steps of a method according to the invention when the computer program is run on a computer. The computer program may be embodied on a computer readable medium.

The measures have the effect that wireless communication for docking is set up as follows. Wireless docking means wirelessly connecting the dockee and the host for using, by the dockee, of a service provided by the host, while initiating docking means initiating the connection setup with the host for use of one or more of the matching services. First a message, the service search signal, is transferred from the dockee, i.e. the device that requires a service, to the host via the near field communication. The service search signal includes a dockee identifier and a dockee service list for indicating services which are relevant to the dockee. Advantageously any host receiving the service search signal via a near field communication channel will be aware of the dockee being present at close range, i.e. within the near field operational distance of at most one meter. Subsequently, upon receiving the service search signal, the host will determine whether it can offer one or more of the services from the number of services as indicated in the dockee service list by the dockee. If so, a matching service set is formed by matching the dockee service list against host services that are available via docking, and a service available signal is generated comprising the dockee identifier and the matching service set for indicating matching services which are both relevant to the dockee and available via docking. The service available signal is transmitted via the host communication unit and received by the dockee communication unit. The dockee processor will, upon receiving the service available signal, determine whether the received dockee identifier corresponds to the dockee identifier of the dockee and any of the matching services is actually required by the dockee. If so, the dockee will initiate wireless docking with the host, i.e. initiate a connection setup for the use of one or more matching services. Advantageously, the host is selected by physically bringing the dockee near the host so as to enable the near field communication. Also, it is automatically determined whether the host has services available that are relevant to the dockee, and such services will be listed in the response signal that is transmitted via the wireless communication such as Wi-Fi. Advantageously, the dockee now directly is aware of the available services, and will initiate docking when appropriate.

Optionally, in the above wireless communication system, the wireless communication is according to a Wi-Fi standard for peer to peer communication, and/or the near field communication is communication via an NFC tag according to the Near Field Communication, both described as such in the Wi-Fi P2P standard. So, in the dockee, the near field transmitter may be a near field communication tag according to the Near Field Communication (NFC) standard, whereas the host has a near field receiver such as an NFC reader. Also, the near field communication may be communication via a data channel across a magnetic field of a wireless battery charging interface, for example the Qi system. The Qi wireless charging system supports a data communication channel from the device being charged, i.e. the dockee, to the charger, i.e. a peripheral charging unit coupled to the host, the channel constituting a near field transmitter at the charged device and a near field receiver at the charger. The Qi wireless charging system is described in: "System Description Wireless Power Transfer, Volume I: Low Power, Part 1: Interface Definition Version 1.0.1, Version 1.0.1, October 2010" available from the Wireless Power Consortium: http://www.wirelesspowerconsortium.com/.

Optionally, in the dockee, the near field transmitter is arranged for transmitting the service search signal further comprising credential data for setting up a secure connection via the wireless communication. Optionally, in the host, the host processor is arranged for, upon wireless docking as initiated by the dockee, applying credential data as received via the service search signal for setting up a secure connection via the wireless communication. The credential data may comprise at least one of a PIN code, public key or hash of the public key of the dockee. Advantageously, the host is enabled to apply the credential data during docking, if such docking is initiated by the dockee later. Advantageously, as the credential data is transferred via near field communication, such data cannot be easily intercepted by other devices, and the set up of a secure connection is quicker.

Optionally, in the dockee, the dockee processor is arranged for, upon receiving the service available signal, determining whether the received dockee identifier corresponds to the dockee identifier of the dockee, and if so, determining that no matching services are available for the dockee and/or the matching services are not required by the dockee, providing feedback to a user indicating that required services are not available. Advantageously, the user has quick feedback that no matching services could be found.

Optionally, in the dockee, the near field transmitter is arranged for transmitting the service search signal further comprising channel data for indicating a channel of the wireless communication to be used for transmitting the service available signal. Also, the near field transmitter may be arranged for transmitting the service search signal further comprising out-of-band data for indicating a further communication modality, different from the wireless communication, to be used for transmitting response data from the host to the dockee. A communication modality different from WiFi may, for example, be Bluetooth. The response data may relate to the matching services and may, for example, be used for docking. Optionally, in the host, the host processor is arranged for, upon receiving the service search signal, applying channel data as received via the service search signal for selecting a channel of the wireless communication for transmitting the service available signal, and/or applying out-of-band data for selecting a further communication modality different from the wireless communication for transmitting response data from the host to the dockee, the response data relating to the matching services. The dockee processor may be arranged for, upon receiving the response data via the further communication channel, activating the dockee communication unit for receiving service available signal via said wireless communication. Advantageously, as the channel data is transferred via near field communication, a required wireless channel or out-of-band channel (OOB) can immediately be used by the host, and the set up of a secure connection is quicker. Also, using the OOB channel may require less power for the dockee and could be used to wake-up the dockees Wi-Fi radio if it is currently in sleep mode. For example, using NFC for waking up a dockees Wi-Fi radio requires the NFC Tag to be electrically connected to the dockee processor and indicating that NFC data has been read by the WDH to the dockee processor.

Any of the above options may be combined in a device being able to support either the role of the dockee or the host, and also the roles of P2P Client and P2P Group owner are possible. Also a single device may have the host function in a first wireless docking environment, and also be a dockee to a different wireless docking environment. Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

In this document wireless docking is about enabling mobile devices (so called dockees, wireless dockees or MDs) to wirelessly connect to a host providing services, e.g. by making available peripherals that are built in and/or coupled to the host, so that applications on the mobile device can make use of these services to improve the experience and productivity of working/interacting with these applications. A discovery/advertisement of services, and managing the connections to peripherals, is performed by a so-called wireless docking host (WDH or host), which makes functionality available through a wireless docking protocol.

Possible dockees include (but are not limited to) mobile phones, laptops, tablets, portable media players, cameras, electronic watches. Possible WDHs include (but are not limited to) dedicated wireless docking station devices, display devices, audio devices, printers, PCs. The wireless docking host may also be a small (PC like) dongle with a display, USB and audio interface. Possible peripherals include (but are not limited to) mice, keyboards, display devices, audio devices, webcams, printers, storage devices, USB hubs, network interfaces. These peripherals may be wireless and may support standards such as Wi-Fi Serial Bus and Wi-Fi Miracast to make their functionality available through the wireless network to other devices such as dockees and WDHs. Wired peripherals may be connected to the wireless host (e.g. USB, HDMI, DVI, VGA, analogue audio, analogue video, etc). Next to services providing access to peripherals, other services may include e.g. providing remote desktop access or access to certain applications, database access (e.g. document archive), network file system access, access to internet and specific internet services, home network services such as DLNA or UPnP services, etc.

Typically, the dockee device and the host device each comprise a microprocessor (not shown) which executes appropriate software stored at the device; for example, that software may have been downloaded and/or stored in a corresponding memory, e.g., a volatile memory such as RAM or a non-volatile memory such as Flash (not shown). The devices may also be equipped with microprocessors and memories (not shown). Alternatively, the devices may, in whole or in part, be implemented in programmable logic, e.g., as field-programmable gate array (FPGA). Dockee and host devices may be implemented, in whole or in part, as a so-called application-specific integrated circuit (ASIC), i.e. an integrated circuit (IC) customized for their particular use.

Also, the functions and units as described below may be implemented at least partly in hardware circuits, which may include a processor circuit and storage circuit, the processor circuit executing instructions represented electronically in the storage circuits.

Figure 1:
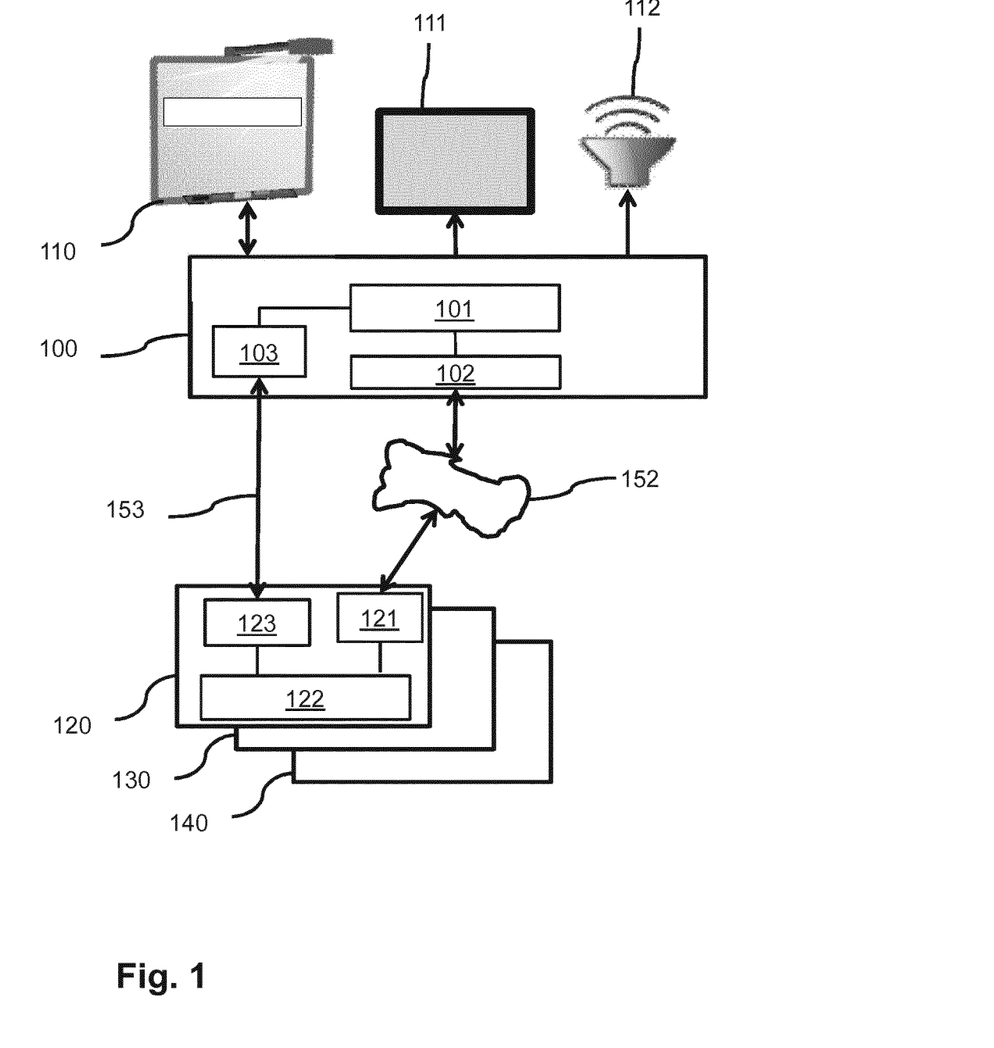
FIG. 1 shows a wireless communication system.

FIG. 1 shows a wireless communication system. The system includes a host device 100 for wireless communication with one or more dockees 120,130,140, for example mobile phones, laptops or tablet computers. Only the first dockee 120 is described in detail below, but further dockees have similar components and functions. The host device is coupled to a number of peripherals 110,111,112 to provide services, e.g. rendering audio or video (AV) data. It is noted that in this document AV data is used for any type of video data, audio data or a combination of video and audio data. The peripherals may include video output devices like a beamer or a display 111, graphical input/output devices like a smartboard 110 or a touch screen, audio output devices like a loudspeaker system 112 or a headphone, user input devices like a mouse or a room control unit; data processing devices like a data storage unit or a printer.

The host device 100 has a host communication unit 102 for accommodating wireless communication 152, for example a Wi-Fi unit, well known as such. The host device further has a host processor 101 arranged for docking at least one dockee. The process of docking a wireless device to a wireless docking host (WDH) is a process of establishing a data link via the available radio channel such as Wi-Fi or Bluetooth, and is known as such as discussed above with reference to WO 2012/117306A1. A description of Bluetooth can be found, for example, in Bluetooth Specification, Core Package version 2.1+EDR, issued: 26 Jul. 2007. The docking process involves providing access to one or more services for the dockee.

The dockee 120 has a dockee communication unit 121 for accommodating said wireless communication with the host. In practice, there may be multiple communication units for that purpose, for example Bluetooth, Wi-Fi and 60 GHz (e.g. WiGig). The dockee further has a dockee processor 122 arranged for docking with the host device for, as a dockee, getting access to the at least one service.

One of the ways to make wireless connectivity simpler for the user is wireless docking. In wireless docking, a so called wireless docking host makes a number of services available to a mobile device, with which the mobile device can setup communication in one go. Any group of peripheral devices and/or services made available by a wireless docking host is called a wireless docking environment. A wireless docking environment may contain a single host and multiple peripherals, or a wireless docking host may accommodate a number of (different) wireless docking environments. A wireless docking host may also make its services available by individual selection of each one. There may also be a number of wireless docking hosts in reach of a mobile device to dock with.

Another way to make it more convenient for the user to use a mobile device is that a peripheral device, e.g. a monitor or a TV, makes it function, its screen, available wirelessly to mobile devices. It can of course frequently happen that there are several of these wireless peripheral devices in wireless reach of a mobile device. Miracast, which is certified by the Wi-Fi Alliance, is a technology with which this is possible. In the current document, any device in combination with peripherals providing wireless docking host functionality to provide access to the peripheral input and/or output functions is called a wireless docking environment.

Traditionally the above mentioned devices may employ Wi-Fi communication to make their wireless docking environment or their function wirelessly available, e.g. by using Wi-Fi Direct. Setting up a Wi-Fi connection requires quite some steps to be taken and the exchange of a number of messages before the two devices are 'associated' over Wi-Fi. This may require quite some user involvement to make sure that the correct devices are going to be connected and takes time during which the user has to wait for the connection to be set up and started. When two devices are associated over Wi-Fi, their Wi-Fi connection is protected cryptographically and an IP connection is established.

Wi-Fi devices can make themselves discoverable wirelessly. This can be done before two devices are associated, so this is called pre-association discovery. There are several types of pre-association discovery. One is pre-association device discovery, whereby a device and some properties of the devices like its name, function, etc. can be discovered. This may be done through beacon frames and probe request frames and probe response frames, well known from IEEE 802.11. Another type is pre-association service discovery, with which the services, e.g. printing, display, etc., offered by a Wi-Fi device can be discovered through IEEE 802.11u Generic Advertisement Service (GAS) frames by others. Such discovery may include information about wireless docking environments being offered for wireless docking.

Since the range of Wi-Fi signals can reach tens of meters, quite a number of devices offering Wi-Fi services may be discovered within Wi-Fi range. The user needs to be involved in selecting the correct device/service to connect to. However, from the list of devices/services presented to the user it may not be very clear which name corresponds to which device. For example, a user is interested in showing content residing in his mobile MP4 player on a large display. Miracast is the commercial name of the Wi-Fi Alliance for a service that displays video received over Wi-Fi. There may be several displays in the user's vicinity that offer the service of rendering video received over Wi-Fi. This can be the case in a modern office building, with many meeting rooms and flexible workplaces equipped with Miracast enabled displays, but also in a home situation, where a home is equipped with several TVs that offer this Wi-Fi service.

The MP4 player of the user displays all the devices that it sees advertizing a video rendering service over Wi-Fi. The user has to select one of the devices. The user then has to set-up the Wi-Fi connection ('pairing'), which may involve reading a PIN code on the video rendering device and entering it in his MP4 player, or some other means of setting up the connection in a secure manner. It is quite frustrating to the user if he took the PIN code from a different device than he selected on his MP4 player, because then the connection cannot be set up.

Proximity based methods allow a user to select the desired device that he wants to use by holding his mobile device close to the desired device. For example by equipping the mobile device with an NFC reader and the desired (host) device is equipped with an NFC tag that next to Wi-Fi handover data provides information about the services that it offers, the mobile device can read out the information about the service provided and setup a connection accordingly.

However, equipping a device with an integrated NFC reader can be costly. There are also a huge amount of legacy devices that do not have an integrated NFC reader. Attaching a static NFC tag to any mobile device would enable use of a proximity based method to select a Wi-Fi device/service amongst a set of Wi-Fi devices/services to automatically set up a connection to, without requiring an integrated NFC reader in the mobile device. Several problems need to be overcome due to the fact that the information provided by these static NFC tags is static (needs to be pre-configured beforehand, and cannot be changed during operation except through another manual configuration step) and that the mobile device is not aware that the static NFC tag is being read.

The system described here enables the use of static NFC tags on mobile devices for proximity based Wi-Fi service selection. The system also enables use of other one-way proximity dependent Out-Of-Band channels, such as Qi Wireless Charging. In the system a first Wi-Fi device, usually a host, may offer services via Wi-Fi. Additionally, the host is equipped with a near field receiver to read data from a near field transmitter at a second Wi-Fi device, usually a dockee, together constituting an Out-of-Band channel providing at least one-way data traffic from the dockee to the host.

In FIG. 1 the wireless communication system has at least one host and at least one dockee. The dockee has a near field transmitter 123, e.g. an NFC tag. The host has a near field receiver 103 for near field communication 153 with the near field transmitter 123 across a near field operational distance of at most one meter. The near field operation distance depends on the respective near field communication type. For example, for NFC the practical near field operational distance is about 10 centimeter.

The near field transmitter is arranged for transmitting a service search signal comprising a dockee identifier and a dockee service list for indicating services which are relevant to the dockee. For example, the indicated service list can be a list of peripherals that a dockee may wish to dock with, e.g. WSB (Wireless Serial Bus) human interface device (HID) services for mouse and keyboard, Wi-Fi Display service, and Wi-Fi Direct Service print service. All or a subset of the services may be actually required at the present time, and when all required services are present, the dockee may wish to dock. Alternatively the dockee or its user may choose to dock also when only a subset or only one of the required services is available.

Said near field transmitting may be initiated by providing wireless power to a circuit such as present in an NFC tag. The power becoming available to the transmitter may initiate transmitting the service search signal through the near field communication. Alternatively, the dockee may be activated by the user, or a control function in the dockee, to transmit the service search signal. The host processor is arranged for, upon receiving the service search signal, responding to the service search signal. Thereto, first a matching service set is determined by matching the dockee service list against host services that are available via docking. Subsequently, a service available signal is generated comprising the dockee identifier and the matching service set for indicating matching services which are both relevant to the dockee and available at the host for use by the dockee. Finally, the service available signal is transferred not via the near field communication but via the host communication unit using the wireless communication, for example via Wi-Fi.

The dockee processor is arranged for, upon receiving the service available signal, determining whether the received dockee identifier corresponds to the dockee identifier of the dockee. Upon correspondence, it is determined whether any of the matching services is actually required by the dockee, and if so, initiating wireless docking with the host, i.e. initiating connection setup with the host for use of one or more of the matching services.

In such a system, the dockee device may provide a pre-configured identifier X and a pre-configured set of service by names/identifiers (Y0, . . . , YN) that can be read via a one-way Out-of-Band channel using reader circuitry of the host device. The host is configured to read the pre-configured identifier X and the pre-configured set of service names/identifiers (Y0, . . . , YN) through the one-way Out-of-Band channel, and further is configured to compare the service identifiers or names for one or more services A which are available at the host with the set of service names/identifiers (Y0, . . . , YN). Subsequently, the host may add identifier X to its wireless communication messages, e.g. to the Wi-Fi beacon, probe request, probe response and/or GAS request and/or response frames when at least one service name/identifier for services A matches with one of the service names/identifiers (Y0, . . . , YN). The dockee is configured to scan the wireless communication, e.g. one or more of the wireless channels on which it can operate for Wi-Fi beacon, probe request, probe response and/or GAS response frames including identifier X. Furthermore the dockee may connect to the host when a Wi-Fi beacon, probe request, probe response and/or GAS response frames including identifier X is found, and the service(s) A are actually required.

Optionally, the information provided through the OOB channel contains credential data such as a PIN code, public key or hash of the public key of the mobile device to the host offering a service. The credential data may be used in setting up a secure WPA-2 connection between the host and dockee. As a result, the user does not have to do anything to authenticate his mobile device to the other Wi-Fi device to set-up the connection in a secure way.

Optionally, the information provided through the OOB channel contains information about a Wi-Fi channel the host should use for sending the Wi-Fi beacon, probe request, probe response and/or GAS response frames including identifier X. The respective channel will be regularly scanned by the dockee. As a result, the mobile device does not have to scan all possible channels and will be able to set up the connection quicker and use less power for its Wi-Fi receiver in this process, since it only needs to listen to a particular channel.

Optionally, the information provided through the OOB channel contains information about a second OOB channel that the first Wi-Fi device can use to provide some feedback or information to the second Wi-Fi device. Such second OOB channel provides a further communication modality different from the wireless communication, and could be using less power for the second Wi-Fi device than to scan one or more Wi-Fi channels (e.g. by using Bluetooth Low Energy, Zigbee, Qi, NFC, . . . ), and could be used to wake-up the dockees Wi-Fi radio if it is currently in sleep mode.

In the following a practical example is discussed, in which a static NFC tag is attached to a mobile device, and a second case in which the mobile device can be wirelessly (inductively) charged through Qi. In both cases the Wi-Fi device (host) that offers one or more Wi-Fi services may be equipped with an Out-Of-Band receiver for the respective OOB system as described below in more detail, i.e. with an NFC reader or with a wireless charger.

In operation, when the mobile device is placed on the NFC reader or the wireless charging spot of the Wi-Fi device that offers one or more Wi-Fi services, the latter will receive the mobile device ID and desired Wi-Fi service included in the service search signal. If the host can provide at least one of the desired services, it responds by advertizing over Wi-Fi (usually on one of the so called 'social' channels) that the desired service is available for the mobile device with the identity provided by the mobile device over the OOB channel in the service available signal. The service available signal may be included in its Wi-Fi beacon, probe request, probe response and/or GAS response frames. When the mobile device sees an advertisement with its identity and desired service, it knows with which Wi-Fi device it may connect to use the advertised service.

Optionally, the OOB channel can transfer the following information:
PIN code, public key or hash of the public key of the mobile device to the Wi-Fi device offering a service.
desired channel to receive confirmation/denial of its request.
desired channel for the Wi-Fi channel to use for the Wi-Fi service.
information pertaining a second OOB channel available to use for providing feedback or information.

Optionally, if the Wi-Fi device that offers one or more Wi-Fi services cannot provide any or all of the desired Wi-Fi services indicated in the service search signal, it may advertize over Wi-Fi (usually on one of the 'social' channels) that a respective desired service is NOT available, or that none of the desired services is available for the mobile device with the identity provided by the mobile device over the OOB channel. Thereto the matching service set may contain a list or table of available and not available services. If no matching service is detected at all, a specific message may be used that indicates both the ID of the dockee and that no service can be made available. When the mobile device sees this advertisement with its identity and no available services, it knows that the requested service is not available and can inform the user quickly that the desired service is not available. This provides feedback to the user much quicker than simply trying to connect and see whether the service works or not.

After a certain timeout period that the Wi-Fi device offering one or more Wi-Fi services started advertizing over Wi-Fi that the desired service is available for the mobile device by adding the identity X provided by the mobile device in its Wi-Fi beacon, probe request, probe response and/or GAS response frames, the host will stop advertizing identity X in its Wi-Fi beacon, probe request, probe response and/or GAS response frames. This can be done e.g. after a fixed time, or after a certain period that it did not receive a Wi-Fi association/connection request from the mobile device to connect to the service, or after a certain period after the mobile device was disassociated or disconnected from the service.

In practice, an NFC static tag may be added to a mobile device, which is a very low-cost way of adding an Out-Of-Band transmitter to a device. The NFC tag contains the ID of the mobile device and the Wi-Fi services the user may be interested in. The ID may be programmed in the NFC tag by a separate NFC programmer, or an ID available in the NFC tag may be programmed in the device. The list of relevant services may also be programmed in the NFC tag, or a predetermined list may already be preset in the NFC tag. The list of relevant services may be ordered in terms of priority. The tag may be glued to the housing of the mobile device or somehow be integrated somewhere in the housing of the mobile device. The static information (i.e. identifier and list of services) is written onto the static NFC tag during a (manual) pre-configuration step, e.g. using a USB NFC tag writer connected to a PC, or by using an NFC tag writer that is nowadays available in many modern smartphones. The same input is entered into the software of the mobile device. Also, the NFC tag may be electrically connected to the CPU of the mobile device, which makes it possible that the CPU can change the tag contents, e.g. change the desired Wi-Fi services based on the user's input.

In a further example the near field communication is embodied by a data channel via wireless charging. The Qi wireless charging systems offer a one-way communication channel from the device being wirelessly charged to the wireless charger (see for example WO 2010/036501). The Qi system can be extended to include the mobile device ID and the desired Wi-Fi service in the data that is communicated to the charger using the wireless communication channel provided by the wireless charging system. Assuming that the Wi-Fi device offering a service is connected to the wireless charger (e.g. through USB), and the mobile device is the device being charged, the Wi-Fi device offering the service can read the information from the mobile device unit using this one-way OOB channel, and start 'advertising' the identity X provided by the mobile device in its Wi-Fi beacon, probe request, probe response and/or GAS response frames, when a match for the desired service is found.

Figure 2:
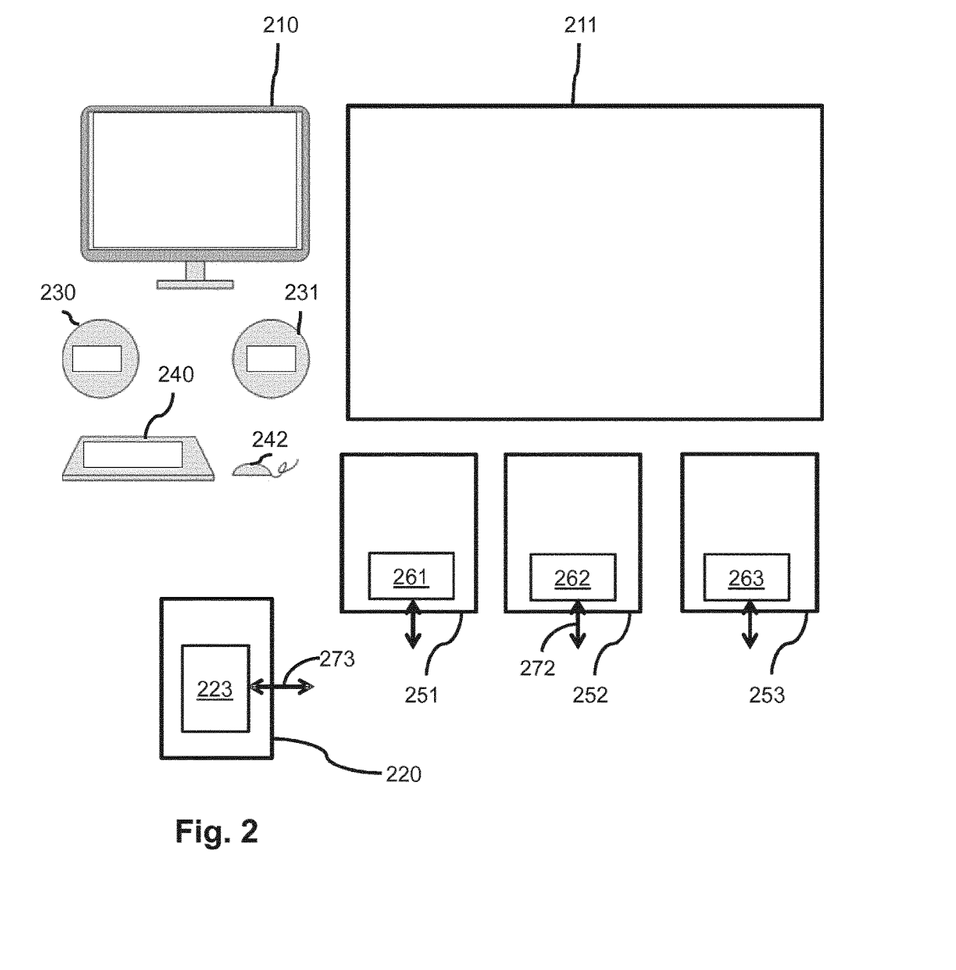
FIG. 2 shows an example of location having a multiple wireless docking environments.

FIG. 2 shows an example of location having a multiple wireless docking environments. The figure shows three host devices 251,252,253 connected to a set of peripherals, for example a display 210, a projection screen 211, personal audio 230 or public audio speakers 231, a keyboard 240 and a mouse 242. The connection between a respective host and individual peripherals is not known to the dockee 220 or its user. Further peripherals may also be coupled via peripheral interfaces, like an Ethernet connection for high speed access to peripherals or internet access to be used by the dockees, a USB interface which may support multiple peripheral connections, or HDMI. The respective hosts 251, 252, 253 may each provide one or more wireless docking environments, which are all available to the dockee 220. Each host has a respective near field receiver 261, 262, 263 for near field communication with a near field transmitter across a near field operational distance 272. The dockee has a near field transmitter 223 having its own near field operational distance 273, which is shown in the Figure to be outside the near field operational distance of any of the three hosts. The dockee may select a wireless docking environment by initiating near field communication with a selected host, by physically bringing the mobile device in the vicinity of one of the near field receivers 261,262,263 coupled to the respective host, i.e. within the near field operational distance of the respective host near field receiver. Such distance is in practice less than one meter, but usually around 10 centimeter.

In an embodiment the near field communication is communication via a data channel across a magnetic field of a battery charging interface.

Figure 3:
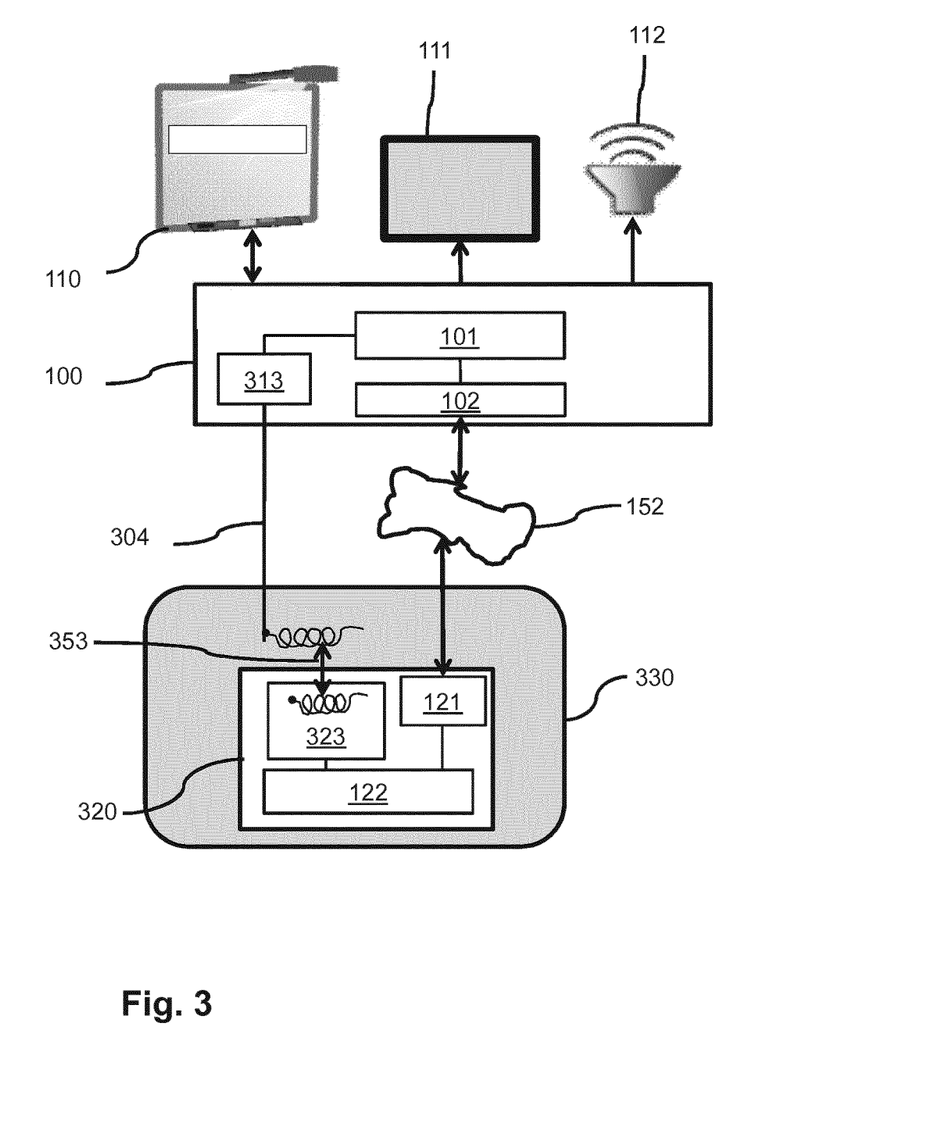
FIG. 3 shows a wireless communication system using near field communication via a wireless charger.

FIG. 3 shows a wireless communication system using near field communication via a wireless charger. In the system, similar to FIG. 1, a first device 100 is shown in the role of host by making available services via wireless communication with a second, mobile device in the role of dockee 320. The host device is coupled to a number of peripherals 110,111,112 to provide the services, e.g. rendering audio or video (AV) data. The host device 100 has a host communication unit 102 for accommodating wireless communication 152, for example a Wi-Fi unit, well known as such. The host further has a host processor 101 arranged for docking at least one dockee. Also the host is provided with an interface unit 313 for interfacing 304 to charger having a charging mat 330, for example via USB interface. The charging mat is provided with one or more coils as schematically shown for magnetically transferring power to a mobile device placed on the mat. Such charging coils, together with a data receiver circuit, constitute the near field receiver. The dockee 320 is provided with a wireless power unit 323 for receiving wireless charging power, while also supporting a data channel via charged coils coupled to the charging coils across a near field operational distance 353. The charged coils, together with a data transmitter circuit, constitute the near field transmitter.

The mobile device is placed on the charging mat of a wireless charger, which charger is part of a wireless docking environment or coupled to some other Wi-Fi device. Subsequently the service search signal is transferred via the magnetic near field communication. Subsequently a response is advertised via Wi-Fi 152 including the service available signal. Subsequently the mobile device tries to connect with the Wi-Fi radio 102 of the wireless docking host. An example of such a wireless charging system is the QI wireless charging system, further described in: "System Description Wireless Power Transfer, Volume I: Low Power, Part 1: Interface Definition Version 1.0.1, Version 1.0.1, October 2010" available from the Wireless Power Consortium: http://www.wirelesspowerconsortium.com/

Figure 4:
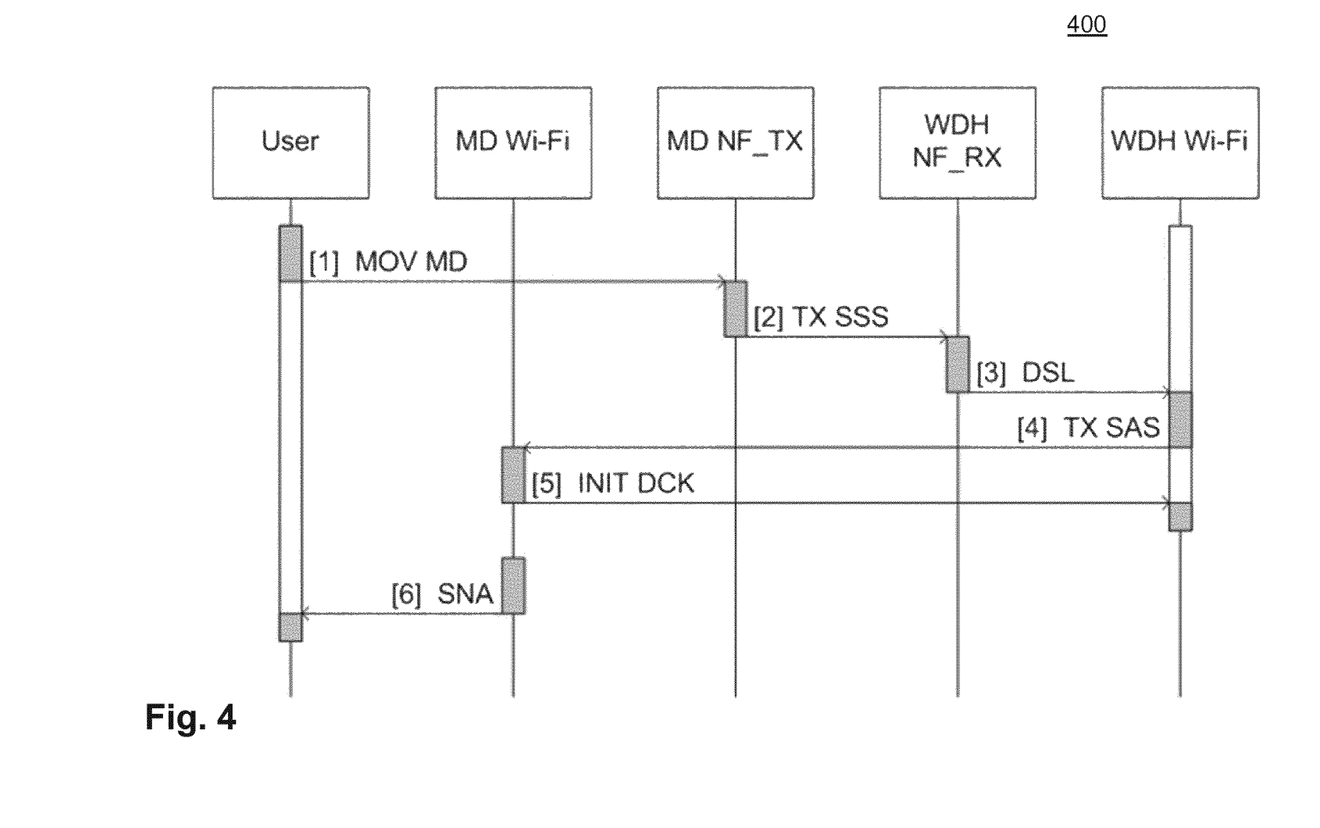
FIG. 4 shows a wireless communication for using a service in an exemplary diagram.

FIG. 4 shows a wireless communication for using a service in an exemplary diagram. The diagram shows a wireless communication protocol 400 of actions of a User, a mobile device Wi-Fi communication unit MD Wi-Fi, a mobile device near field transmitter MD NF_TX, a wireless docking host near field receiver WDH NF_RX and a wireless docking host Wi-Fi communication unit WDH Wi-Fi. In a first action [1] MOV MD the user places the mobile device near the host device, in particular within the near field operational range of the near field receiver of the host. Subsequently, in a second action [2] TX SSS the mobile device near field transmitter MD NF_TX is triggered to transmit the service search signal SSS comprising a dockee identifier and a dockee service list for indicating services which are relevant to the dockee. The SSS is received at the wireless docking host near field receiver WDH NF_RX. Subsequently, in a third action [3] DSL the dockee identifier and a dockee service list are transferred to the host processor, and are matched against available services for determining a matching service set. Next, the service available signal SAS is generated comprising the dockee identifier and the matching service set for indicating matching services which are both relevant to the dockee and available via wireless docking. Alternatively, the matching service set may also indicate the services that are not available or that there are no services available at all. Subsequently, in a fourth action [4] TX SAS the service available signal is transferred from the host communication unit WDH Wi-Fi to the dockee communication unit MD Wi-Fi. The dockee processor, upon receiving the service available signal, determines whether the received dockee identifier corresponds to the dockee identifier of the dockee and any of the matching services is actually required by the dockee. If so, via action [5] NIT DCK wireless docking with the host is initiated by sending a docking request to the host as elucidated below. Alternatively, via action [6] SNA Service Not Available the mobile device may notify the User that a required service is not available, or that none of the required services are available. Optionally, the mobile device may also notify the user that some or all required services are available.

The Service Search Signal may contain several types of information, e.g.

Docking Service Indication (see table 2 below)

Dockee Identifier (could be MAC address or any suitable identifier)

Channel Indication

Secondary Channel Indication

PIN code

Public Key

Hash of Public Key

In order to distinguish the types of information, a Tag Length Value (TLV) encoding may be used. In TLV encoding, one instance of a type of information is stored in an attribute. Each attribute contains three fields, 2 fixed length fields and one variable length field. The attributes may be put in a message consecutively without any additional separation.

The first field of an attribute is of fixed length field and contains the tag. The value of the tag field indicates the type of information, see e.g. table 1.

The second fixed length field of an attribute contains the length of the total attribute or of the length of the third variable length field.

The third variable length field contains information, e.g. in case of a Docking Service Indication, the third field may e.g. contain "USB Keyboard", or in case of a PIN Code, "1234". See also table 2a and 2b.

The above is not the only way to encode the several types of information. E.g. it is also possible to use XML (Extensible Markup Language). The latter uses much more bits than TLV encoding.

For example, when NFC is used as the near field channel, the attributes may be stored in a so-called NDEF (NFC Data Exchange Format) record, as specified by the NFC Forum. They NDEF Record type should be set to a suitable value, e.g. to the MIME media type "application/vnd.wfa.docking". Table 3a and 3b show some further attributes.

TABLE 1

Tag definition example

| Tag Value (decimal) | Tag definition | Type of encoding |
|---|---|---|
| 0 | Docking Service Indication | String |
| 1 | Dockee Identifier | Hexadecimal number, most significant digit first |
| 2 | Channel Indication | Decimal number |
| 3 | Secondary Channel Indication | Decimal number |
| 4 | PIN code | Decimal number |
| 5 | Public Key | Hexadecimal number, most significant digit first |
| 6 | Hash of Public Key | Hexadecimal number, most significant digit first |

TABLE 2a

Examples of Docking Service Indications that may be used in the third field of the TLV encoding

| Docking Service Indications (variable length string) | Comment |
|---|---|
| Wi-Fi Display | Offers video and audio rendering over Wi-Fi |
| Wi-Fi Direct Services PRINT | Offers printing over Wi-Fi |
| WSB Keyboard | WSB (Wireless Serial Bus) is USB offered over a Wi-Fi connection |
| WSB Mouse | |
| WSB Display | |
| WSB Audio | |
| WSB Display | USB Display over Wi-Fi; alternative way for video. The WDH may offer more than one way to make a video screen available for a dockee and a dockee may select the method it supports. |
| Internet Connection | Offers an internet connection through the WDH |
| WSB Camera | |
| WSB microphone | |

TABLE 2b

Examples of numerical Docking Service Indications that may be used in the third field of the TLV encoding

| Docking Service Indication Value in third field (1 ASCII character) | Docking Service that is indicated | Comment |
|---|---|---|
| 0 | Wi-Fi Display | Offers video and audio rendering over Wi-Fi |
| 1 | Wi-Fi Direct Services PRINT | Offers printing over Wi-Fi |
| 2 | WSB Keyboard | WSB (Wireless Serial Bus) is USB offered over a Wi-Fi connection |
| 3 | WSB Mouse | |
| 4 | WSB Display | |
| 5 | WSB Audio | |
| 6 | WSB Display | USB Display over Wi-Fi; alternative way for video. The WDH may offer more than one way to make a video screen available for a dockee and a dockee may select the method it supports. |
| 7 | Internet Connection | Offers an internet connection through the WDH |
| 8 | WSB Camera | |
| 9 | WSB microphone | |

TABLE 3a

Example of some further attributes

| Value (ASCII characters) | Comment |
|---|---|
| 0 | Tag Docking Service Indication |
| 12 | Length of third field in decimal encoding |
| WSB Keyboard | Indicated Docking service |
| 2 | Tag Channel Indication |
| 2 | Length of third field in decimal encoding |
| 20 | Channel number in decimal encoding |
| 4 | Tag PIN code |
| 4 | Channel number in decimal encoding |
| 1234 | PIN Code of dockee in decimal encoding |

TABLE 3b

Example of some further attributes, using numeric encoding of the indicated docking services as shown e.g. in Table 2b

| Value (ASCII characters) | Comment |
| --- | --- |
| 0 | Tag Docking Service Indication |
| 1 | Length of third field in decimal encoding |
| 2 | Indicating WSB Keyboard Docking service in decimal encoding |
| 2 | Tag Channel Indication |
| 2 | Length of third field in decimal encoding |
| 20 | Channel number in decimal encoding |
| 4 | Tag PIN code |
| 4 | Channel number in decimal encoding |
| 1234 | PIN Code of dockee in decimal encoding |

Alternatively, the data channel of Qi may also be used. That data channel in Qi transfers so-called packets. The packets in Qi are basically the attributes as described above. The packet Header consists of a Tag part and a Length part. The Length part determines the size of the rest of the Qi packet. The maximum size of the Qi packets is rather small, so a numeric or better still binary encoding of the docking services is more appropriate to use. A numeric encoding encodes a decimal number as one or more ASCII characters that denote the numerals of the number. One may store one decimal numeral, in one byte this way. A binary encoding of a number uses a bit pattern to encode a number. In the first case, only 10 possible values may be stored in one byte and in the latter case, 256 possible values.

The Service Available Signal SAS may consist of a list of docking services that the dockee transmitted in its Service Search Signal SSS, together with the status of each listed service. Status may be Available—Not Available, but the status may include more possibilities, such as 'WDH supports the service but service is in use by another dockee'. The Service available signal consists of the following types of information Docking Service Indication (see table 4a and 4b)

Dockee Identifier (e.g. MAC address or any suitable identifier, see table 1)

The Service Available Signal may be a new signal in Wi-Fi ('frame' in Wi-Fi Direct terms) or it may be embedded in existing Wi-Fi frames, such as Probe Request, Probe Response, Beacon frame, GAS (Generic Advertisement Service) Initial Request frame GAS Initial Response frame GAS Comeback Request Frame GAS Comeback Response Frame The GAS frames are also available as Protected GAS frames.

The Probe Request, Probe response and Beacon Frames comprise the attributes as explained before. New attributes and their Attribute values should be defined for the Docking Service Indication and the Dockee Identifier. The Docking Service Indication values may be e.g. as shown in Table 4a, using strings, or in table 4b, using numeric values.

TABLE 4b

Examples of Docking Service Indications that may be used in the third field of the TLV encoding for the Service available Signal Docking Service Indications

| Status (1 ASCII character) | Docking Service (variable length string) | Comment |
| --- | --- | --- |
| 'A' or 'N' | Wi-Fi Display | Video and audio rendering over Wi-Fi is available ('A') or not available 'N' |
| 'A' or 'N' | Wi-Fi Direct Services PRINT | Printing over Wi-Fi is available ('A') or not available 'N' |
| 'A' or 'N' | WSB Keyboard | WSB keyboard over a Wi-Fi connection is available ('A') or not available 'N' |
| 'A' or 'N' | WSB Mouse | WSB mouse over a Wi-Fi connection is available ('A') or not available 'N' |
| 'A' or 'N' | WSB Display | WSB display over a Wi-Fi connection is available ('A') or not available 'N' |
| 'A' or 'N' | WSB Audio | WSB Audio over a Wi-Fi connection is available ('A') or not available 'N' |
| 'A' or 'N' | WSB Display | WSB Display over a Wi-Fi connection is available ('A') or not available 'N' |
| 'A' or 'N' | Internet Connection | Offers an internet connection through the WDH is available ('A') or not available 'N' |
| 'A' or 'N' | WSB Camera | WSB camera over a Wi-Fi connection is available ('A') or not available 'N' |
| 'A' or 'N' | WSB microphone | WSB microphone over a Wi-Fi connection is available ('A') or not available 'N' |

TABLE 4b

Examples of numeric Docking Service Indications that may be used in the third field of the TLV encoding for the Service available Signal Docking Service Indications

| Status (1 ASCII character) | Docking Service (2 ASCII characters) | Comment |
| --- | --- | --- |
| 'A' or 'N' | 00 | Video and audio rendering over Wi-Fi is available ('A') or not available 'N' |
| 'A' or 'N' | 01 | Printing over Wi-Fi is available ('A') or not available 'N' |
| 'A' or 'N' | 02 | WSB keyboard over a Wi-Fi connection is available ('A') or not available 'N' |
| 'A' or 'N' | 03 | WSB mouse over a Wi-Fi connection is available ('A') or not available 'N' |
| 'A' or 'N' | 04 | WSB display over a Wi-Fi connection is available ('A') or not available 'N' |
| 'A' or 'N' | 05 | WSB Audio over a Wi-Fi connection is available ('A') or not available 'N' |
| 'A' or 'N' | 06 | WSB Display over a Wi-Fi connection is available ('A') or not available 'N' |
| 'A' or 'N' | 07 | Offers an internet connection through the WDH is available ('A') or not available 'N' |
| 'A' or 'N' | 08 | WSB camera over a Wi-Fi connection is available ('A') or not available 'N' |
| 'A' or 'N' | 09 | WSB microphone over a Wi-Fi connection is available ('A') or not available 'N' |

Binary encoding or mixed encodings are also possible.

In addition to what is shown in Table 4a and Table 4b, there could be a Docking Service Indication that denotes that there is no Docking Service available at all.

Although the GAS frames are differently structured frames than the ones used for Probe Request frames, Probe Response frames and Beacon frames, the Service Available Signal may be added in ways similar as described above to the GAS Initial Request frame, GAS Initial Response frame, GAS Comeback Request frame, GAS Comeback Response Frame and their protected counterparts.

Figure 5:
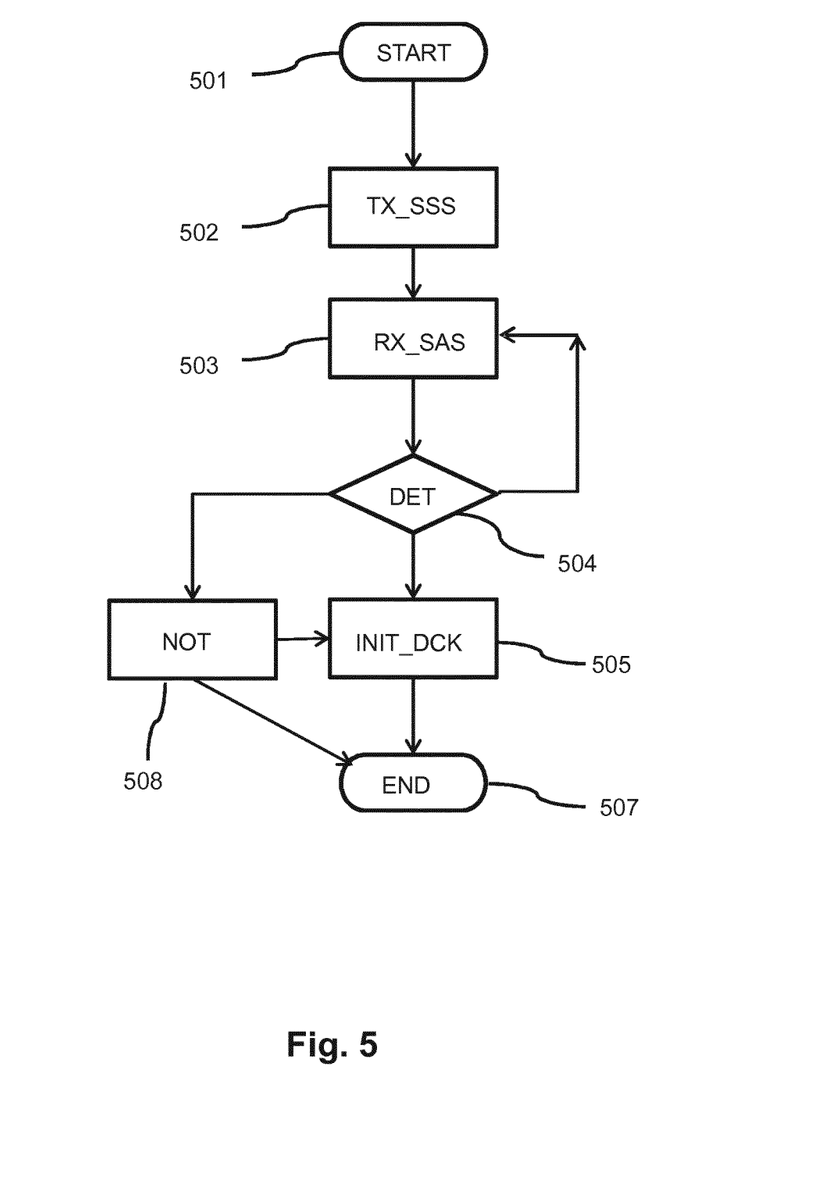
FIG. 5 shows a method of wireless communication for using a service at a dockee.

FIG. 5 shows a method of wireless communication for using a service at a dockee. The dockee method enables wireless communication between a dockee and one or more hosts. The host and the dockee have been elucidated with reference to FIGS. 1 and 2. The dockee is arranged for wireless docking with the host for using a service, and has a near field transmitter for near field communication with a near field receiver across the near field operational distance. The dockee method initially starts at START 501 and is triggered by the user placing the dockee within the near field operational distance of the near field receiver of the host. Next, at TX_SSS 502, the near field transmitter transmits a service search signal comprising a dockee identifier and a dockee service list for indicating services which are relevant to the dockee. As described below, the host may send the service available signal SAS in response. Next, at RX_SAS 503, upon receiving the service available signal, at node DET 504 it is determined whether the received dockee identifier corresponds to the dockee identifier of the dockee and any of the matching services is actually required by the dockee. If so, the method continues at node INIT_DCK 505 by initiating the wireless docking with the host. At node DET 504, if no service available signal is received, the method may return to node RX_SAS until a timeout has passed. If no service available signal is received at all, or if the SAS indicates that no services are available, the user may be notified at node NOT 508, e.g. by a display message or audio signal. The user may also be notified at node NOT 508 if only some services are available, or if the user has to make a choice between available services. If an available service is selected, the dockee method may continue by initiating docking at node INIT_DCK 505. The method ends at node END 507.

Figure 6:
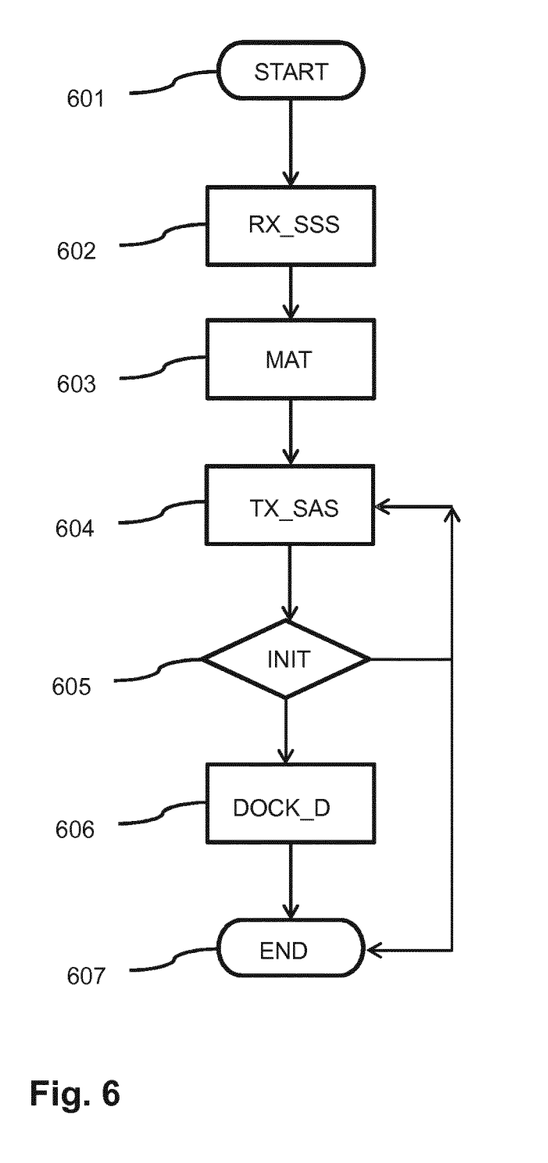
FIG. 6 shows a method of wireless communication for providing a service at a host.

FIG. 6 shows a method of wireless communication for providing a service at a host. The host method enables wireless communication between a host and a dockee. The host and the dockee have been elucidated with reference to FIGS. 1 and 2. The host is arranged for wireless docking for providing a service. The host has a near field receiver for near field communication with a near field transmitter across a near field operational distance. The host method initially starts at START 601 and is triggered by the user placing the dockee within the near field operational distance of the near field receiver of the host, and the dockee near field transmitter sending the service search signal SSS. Next, at RX_SSS 602 the host detects receiving the service search signal. Next, at MAT 603, the dockee service list is matched against the services that are available at the host. A service available signal SAS is generated comprising the dockee identifier and the matching service set for indicating matching services which are both relevant to the dockee and available via wireless docking. In addition to what is shown in Table 4a and Table 4b, there could be a Docking Service Indication that denotes that there is no Docking Service available at all. At node TX_SAS 604 the service available signal is transmitted via the host communication unit. At node INIT 605, the host waits if the dockee responds by initiating docking. If so, at node DOCK_D, the docking of the respective dockee is further handled, and continues until it finally terminates at node END 607. If no response is received, the method may return to node TX_SAS 604 to repeat sending the service available signal for some predetermined time. If still no response is received the method terminates at node END 607.

In practice the methods may be implemented in host software (host method) and dockee software (dockee method), e.g. a so-called app. Such computer program products are for wireless docking between a host and a dockee, and comprise a program operative to cause a processor to perform the host or dockee method.

Although the invention has been mainly explained by embodiments using wireless docking, the invention is also suitable for any wireless system where a mobile device (having the dockee role) wants to connect to a further wireless devices (having the host role) to connect to, or share, one or more peripherals or services. It is to be noted that the invention may be implemented in hardware and/or software, using programmable components. In practice, the invention may be applied in devices that offer their services over Wi-Fi, such as TVs, monitors, audio systems, printers, USB peripherals, wireless docking stations, etc. The dockee may be a mobile device such as a MP3 or MP4 player that wants to use renderers such as TVs, monitors, audio systems over Wi-Fi, and in fact any mobile device, smart phone, tablet, laptop, etc., that wants to use services over Wi-Fi (printing, docking, internet access, etc.).

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention may be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A wireless communication system comprising a host and a dockee, the host arranged for providing at least one service via wireless communication, and the dockee arranged for wireless docking with the host for using the at least one service, the host comprising:
a host communication unit for the wireless communication;
a near field receiver for near field communication with a near field transmitter across a near field operational distance of at most one meter;
a host processor coupled to the host communication unit and the near field receiver, and arranged for docking the dockee;

the dockee comprising:
- a dockee communication unit for the wireless communication;
- a dockee processor coupled to the dockee communication unit and arranged for docking with the host;
- a near field transmitter for the near field communication with the near field receiver across the near field operational distance, the near field transmitter being arranged for transmitting, via a one-way out-of-band channel, a service search signal comprising a dockee identifier and a predetermined dockee service list for indicating services which are relevant to the dockee;

wherein the host processor is arranged, upon receiving the service search signal via the near field receiver, for:
- determining a matching service set by matching the predetermined dockee service list against the services that are available at the host;
- generating a service available signal comprising the dockee identifier and the matching service set for indicating matching services which are relevant to the dockee and available at the host; and
- transmitting the service available signal via the host communication unit;

wherein the dockee processor is arranged for, upon receiving the service available signal via the dockee communication unit, determining whether the received dockee identifier corresponds to the dockee identifier of the dockee and whether any of the matching services is required by the dockee, and initiating the wireless docking with the host via the dockee communication unit.

2. The wireless communication system as claimed in claim 1, wherein the near field communication is communication via a data channel across a magnetic field of a battery charging interface, or the wireless communication is according to a Wi-Fi standard for peer to peer communication.

3. A host for use in a wireless communication system, wherein the host is arranged for wireless docking for providing a service via wireless communication, the host comprising:
- a host communication unit for the wireless communication;
- a near field receiver for near field communication with a near field transmitter across a near field operational distance; and
- a host processor coupled to the host communication unit and the near field receiver, and arranged for docking the dockee, the host processor being arranged, upon receiving a service search signal via a one-way out-of-band channel by the near field receiver, for:
  - determining a matching service set by matching a predetermined dockee service list against the services that are available at the host;
  - generating a service available signal comprising a dockee identifier and the matching service set for indicating matching services which are relevant to the dockee and available at the host; and
  - transmitting the service available signal via the host communication unit.

4. The host as claimed in claim 3, wherein the host processor is arranged for, upon wireless docking as initiated by the dockee, applying credential data as received via the service search signal for setting up a secure connection via the wireless communication.

5. The host as claimed in claim 3, wherein the host processor is arranged for, upon receiving the service search signal,
- applying channel data as received via the service search signal for selecting a channel of the wireless communication for transmitting the service available signal, or
- applying out-of-band data for selecting a further communication modality different from the wireless communication for transmitting response data from the host to the dockee, the response data relating to the matching services.

6. A dockee for use in a wireless communication system, wherein the dockee is arranged for wireless docking with a host for using a service via wireless communication, the dockee comprising:
- a dockee communication unit for the wireless communication;
- a dockee processor coupled to the dockee communication unit and arranged for docking with the host; and
- a near field transmitter for near field communication with a near field receiver across a near field operational distance, the near field transmitter being arranged for transmitting, via a one-way out-of-band channel, a service search signal comprising a dockee identifier and a predetermined dockee service list for indicating services which are relevant to the dockee, and upon receiving a service available signal via the dockee communication unit, the service available signal comprising a dockee identifier and a matching service set for indicating matching services which are relevant to the dockee and available at the host, the dockee processor being arranged for, determining whether the received dockee identifier corresponds to the dockee identifier of the dockee and whether any of the matching services is required by the dockee, and initiating the wireless docking with the host via the dockee communication unit.

7. The dockee as claimed in claim 6, wherein the near field transmitter is arranged for transmitting the service search signal further comprising credential data for setting up a secure connection via the wireless communication.

8. The dockee as claimed in claim 6, wherein the dockee processor is arranged for, upon receiving the service available signal via the dockee communication unit, determining whether the received dockee identifier corresponds to the dockee identifier of the dockee, and if so, determining that the matching services are not required by the dockee, providing feedback indicating that required services are not available.

9. The dockee as claimed in claim 6, wherein the near field transmitter is arranged for transmitting the service search signal further comprising channel data for indicating a channel of the wireless communication to be used for transmitting the service available signal.

10. The dockee as claimed in claim 6, wherein the near field transmitter is arranged for transmitting the service search signal further comprising out-of-band data for indicating a further communication modality different from the wireless communication to be used for transmitting response data from the host to the dockee, the response data relating to the matching services.

11. The dockee as claimed in claim 10, wherein the dockee processor is arranged for, upon receiving the response data via the further communication modality, activating the dockee communication unit for receiving service available signal via said wireless communication.

12. The dockee as claimed in claim 6, wherein the near field transmitter is a near field communication tag according to a Near Field Communication (NFC) standard.

13. A method of wireless communication in a wireless communication system that includes a host configured for wireless docking a dockee, the method comprising:
- providing a host communication unit for the wireless communication;
- providing a near field receiver for near field communication with a near field transmitter across a near field operational distance;
- providing a host processor coupled to the host communication unit and the near field receiver, the host processor being configured for docking the dockee;
- receiving a service search signal via a one-way out-of-band channel by the near field receiver;
- determining a matching service set by matching a predetermined dockee service list against the services that are available at the host;
- generating a service available signal comprising a dockee identifier and the matching service set for indicating matching services which are relevant to the dockee and available at the host; and
- transmitting the service available signal via the host communication unit.

14. A method of wireless communication in a wireless communication system that includes a host configured for wireless docking a dockee, the method comprising:
- providing a dockee communication unit for the wireless communication;
- providing a dockee processor coupled to the dockee communication unit and configured for docking with the host;
- providing a near field transmitter for near field communication with a near field receiver across a near field operational distance;
- transmitting by the near field transmitter, via a one-way out-of-band channel, a service search signal comprising a dockee identifier and a predetermined dockee service list for indicating services which are relevant to the dockee;
- receiving a service available signal via the dockee communication unit, the service available signal comprising a dockee identifier and a matching service set for indicating matching services which are relevant to the dockee and available at the host;
- determining whether the received dockee identifier corresponds to the dockee identifier of the dockee and whether any of the matching services is required by the dockee; and
- initiating the wireless docking with the host via the dockee communication unit.

* * * * *